(12) United States Patent
Lee et al.

(10) Patent No.: US 9,087,526 B1
(45) Date of Patent: Jul. 21, 2015

(54) METHOD OF CONTROLLING POWER IN OPTICAL DISC APPARATUS

(71) Applicant: HITACHI-LG DATA STORAGE KOREA, INC., Seoul (KR)

(72) Inventors: Heejung Lee, Seoul (KR); Seungho Kwon, Seoul (KR); Seokil Ko, Seoul (KR); Jeongchae Youn, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 0 days.

(21) Appl. No.: 14/567,265

(22) Filed: Dec. 11, 2014

(30) Foreign Application Priority Data

Jan. 6, 2014 (KR) .......................... 10-2014-0001474

(51) Int. Cl.
*G11B 7/1263* (2012.01)

(52) U.S. Cl.
CPC .................................... *G11B 7/1263* (2013.01)

(58) Field of Classification Search
None
See application file for complete search history.

(56) References Cited

U.S. PATENT DOCUMENTS

| | | | |
|---|---|---|---|
| 2003/0099174 A1* | 5/2003 | Ota et al. | 369/47.51 |
| 2008/0212426 A1* | 9/2008 | Van Endert | 369/47.53 |
| 2009/0052306 A1* | 2/2009 | Ikeda et al. | 369/116 |
| 2009/0213708 A1* | 8/2009 | Kusanagi | 369/47.5 |

* cited by examiner

*Primary Examiner* — Wayne Young
*Assistant Examiner* — Brian Butcher
(74) *Attorney, Agent, or Firm* — Birch, Stewart, Kolasch & Birch, LLP

(57) ABSTRACT

A method of controlling power in an optical disc apparatus is provided. A method of controlling power in an optical disc apparatus includes: measuring a temperature of an inside of the optical disc apparatus; calculating, based on the measured temperature, a driving value with which a laser diode (LD) outputs target power; and driving the LD with the calculated driving value. The driving value uses a function in which a temperature acts as a variable and may be calculated for a read channel and a write channel in a divided manner. In the read channel, a driving value of read power in a read mode and a driving value of read power in a record mode may be calculated using different functions, and in the write channel, a driving value of at least one segment of record power divided into two or more segments may be calculated using different functions.

6 Claims, 5 Drawing Sheets

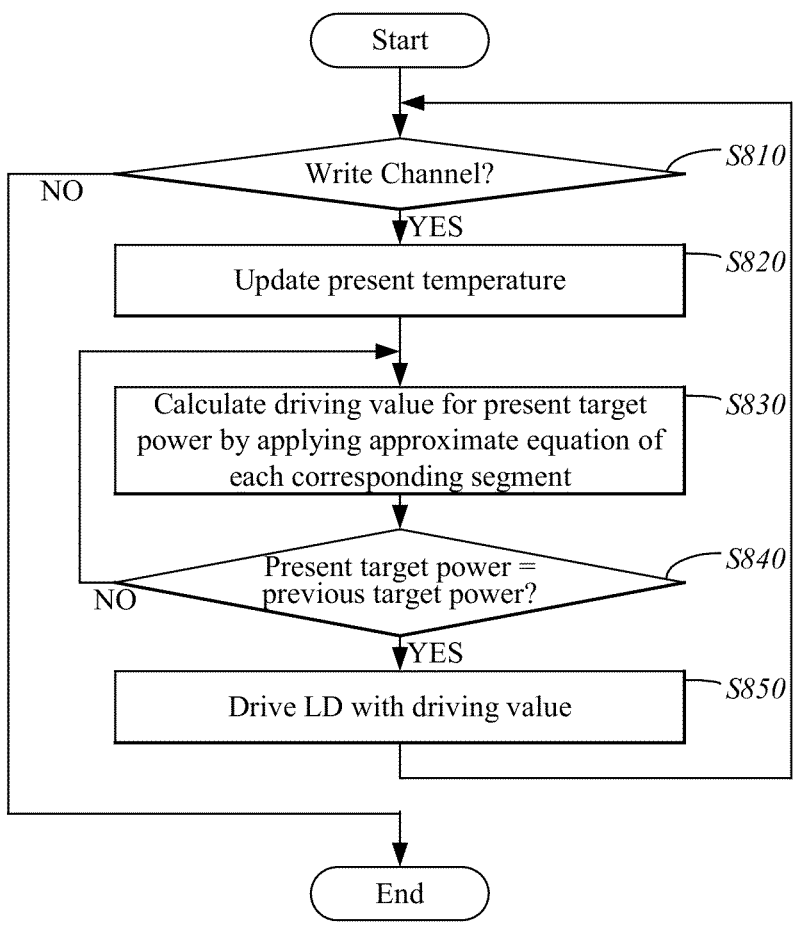

METHOD OF CONTROLLING POWER IN OPTICAL DISC APPARATUS

BACKGROUND OF THE INVENTION

1. Field of the Invention

The present invention relates to a method of controlling power in an optical disc apparatus, and more particularly, to a method of adjusting record and reproduction power without using a component for measuring power of emitting light of a laser diode in an optical disc apparatus.

2. Description of the Related Art

An optical disc apparatus records data or reads data recorded at an optical disc by radiating light emitted from a laser diode to the optical disc. In the optical disc apparatus, while recording data or reproducing data, an internal temperature changes and an operation condition of the laser diode is changed according to a temperature change and thus in order to enhance a data record quality or a data reproduction quality, power of output light of the laser diode should be constantly maintained or should be maintained in a desired level.

FIG. 1 is a diagram illustrating a method of constantly maintaining laser power using a conventional Front Monitor Diode (FMD).

The optical disc apparatus adopts an FMD separately from a laser diode (LD) to monitor light output from the laser diode and constantly adjusts light regardless of an internal temperature based on the monitored light. The FMD detects and outputs laser power which the LD presently outputs, and a Digital Signal Processor (DSP) performs A/D conversion of an output of the FMD and converts present laser power to a DAC value, which is driving data that drives the LD, compares the DAC value with target power, calculates a power reduction amount, performs D/A conversion of the power reduction amount to a current, applies the current to the LD, compensates an output power change of the LD according to a temperature change, and maintains output laser power to a target value.

SUMMARY OF THE INVENTION

The present invention has been made in view of the above problems, and provides a method of constantly maintaining laser power without using a component for measuring output power of an LD in an optical disc apparatus.

In accordance with an aspect of the present invention, a method of controlling power in an optical disc apparatus includes: measuring a temperature of an inside of the optical disc apparatus; calculating, based on the measured temperature, a driving value with which a laser diode (LD) outputs target power; and driving the LD with the calculated driving value.

The calculating may include calculating the driving value using a function in which a temperature acts as a variable.

The function may be stored at a nonvolatile memory in a production process of the optical disc apparatus.

The calculating may calculate the driving value for a read channel and a write channel in a divided manner.

The calculating may calculate, for the read channel, a driving value of read power in a read mode and a driving value of read power in a record mode using different functions.

The calculating may calculate, for the write channel, a driving value of at least one segment of record power which is divided into two or more segments using a function different from a function of another segment.

The calculating may further include searching for a segment to which target record power belongs.

In accordance with another aspect of the present invention, an optical disc apparatus includes: an optical pickup configured to read data from an optical disc or to record data in an optical disc using output light of a Laser Diode (LD); an optical driving unit configured to drive the LD; a thermistor configured to measure a temperature of an inside of the optical disc apparatus; and a calculation configured to calculate a driving value with which the LD can output target power based on a temperature measured by the thermistor and to output the driving value to the optical driving unit.

(Advantages)

Therefore, laser power can be constantly maintained without using a component for measuring output power of an LD.

Further, by reducing the number of components, a production cost of an optical disc apparatus can be reduced.

BRIEF DESCRIPTION OF THE DRAWINGS

The objects, features and advantages of the present invention will be more apparent from the following detailed description in conjunction with the accompanying drawings, in which:

FIG. 8 is a flowchart illustrating operation of controlling record power according to an exemplary embodiment of the present invention.

DETAILED DESCRIPTION OF EXEMPLARY EMBODIMENTS

Hereinafter, a method of controlling power in an optical disc apparatus according to an exemplary embodiment of the present invention will be described in detail with reference to the accompanying drawings.

An existing optical pickup monitors laser power presently emitted through an FMD element and compensates reducing laser power against target power according to temperature increase, thereby enabling to maintain constant output power.

Figure 1:
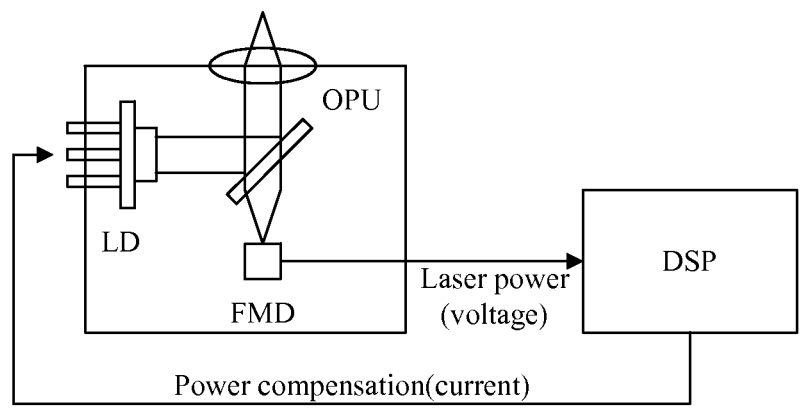
FIG. 1 is a diagram illustrating a method of constantly maintaining laser power using a conventional FMD.
Figure 2:
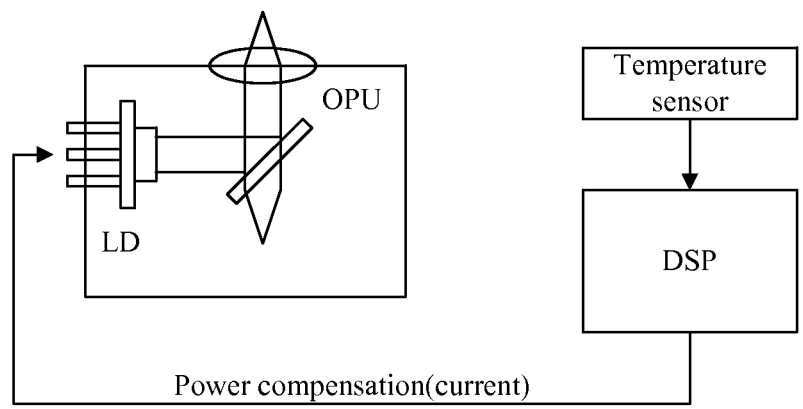
FIG. 2 is a diagram illustrating a method of controlling power according to an exemplary embodiment of the present invention.

FIG. 2 is a diagram illustrating a method of controlling power according to an exemplary embodiment of the present invention.

In the present invention, a temperature is measured using a thermistor instead of an FMD, and a digital signal processor (DSP) obtains a driving value corresponding to a measured temperature using an approximate equation that expresses a correlation between a temperature and a driving value for driving target power, drives an LD with the driving value through an LD driving circuit and thus enables to maintain output power to target power, thereby securing a performance of the optical disc apparatus.

The DSP includes an approximate equation, for at least one target power, of a correlation between a temperature and a driving value for driving a corresponding target power, obtains a driving value necessary for outputting the target power at a present temperature using the approximate equation, and implements algorithm for maintaining target power, and drives an LD with the driving value obtained by the algorithm.

Figure 3:
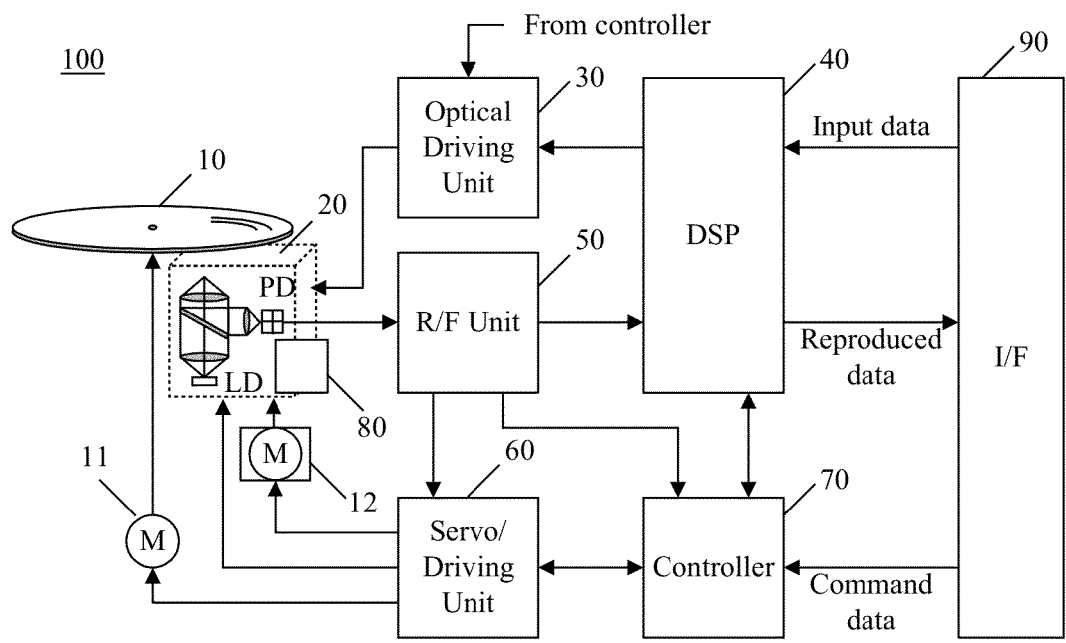
FIG. 3 is a block diagram illustrating a configuration of an optical disc apparatus to which the present invention is applied.

A method of controlling power according to an exemplary embodiment of the present invention may be applied to a disk reproduction/record apparatus that can read data from an optical disc such as a Compact disc (CD), a Digital Versatile Disc (DVD), and a Blu-ray disc (BD) or that can record data in an optical disc, and FIG. 3 is a block diagram illustrating a configuration of an optical disc apparatus to which the present invention is applied.

An optical disc apparatus 100 according to an exemplary embodiment of the present invention includes a spindle motor 11, a sled motor 12, an optical pickup 20 that records data in or reads data from an optical disc 10 using a laser beam, a record/reproduction unit that drives the spindle motor 11, the sled motor 12, and the optical pickup 20 and that processes a servo signal and record/reproduction data, a controller 70 that controls the record/reproduction unit, a thermistor 80 that measures a temperature of the inside of the optical disc apparatus, particularly, a periphery of the optical pickup 20, and an interface unit 90 that receives a data transmission command from an external host by communicating with the host and that transmits data read from the optical disc to the host, and the record/reproduction unit may include an optical driving unit 30, the Digital Signal Processor (DSP) 40, an R/F unit 50, and a servo/driving unit 60. The optical driving unit 30 may be included in the optical pickup 20.

The DSP 40 adds an Error-Correcting Code (ECC) to input digital data and converts the digital data to a record format, the optical driving unit 30 outputs a light quantity driving signal corresponding to an input signal, and the optical pickup 20 records data at the optical disc 10 according to the light quantity driving signal or reads data from a record surface of the optical disc 10.

The optical driving unit 30 outputs a WDAC, which is a record pulse signal for forming marks on a recording layer of a disk, to the LD of the optical pickup 20 when recording data in the disk and outputs a value of a level necessary for reading data to the LD of the optical pickup 20 when reading data from the disk.

The R/F unit 50 outputs a signal detected from the optical pickup 20 to a binary signal by filtering and shaping the detected signal and generates and outputs a tracking error signal TE, a focus error signal FE, and an RF signal, and the DSP 40 restores the binary signal to original data with a self-clock in which a phase is synchronized, and the servo/driving unit 60 generates servo signals necessary for focusing servo, tracking servo, sled servo, and spindle servo based on signals from the R/F unit 50, drives the spindle motor 11 that rotates the optical disc 10, drives the sled motor 12 that moves the optical pickup 20 in an inner circumference and outer circumference direction of the optical disk 10, and drives a current necessary for focusing servo and tracking servo of an objective lens within the optical pickup 20.

The controller 70 controls each element to record data at the optical disc or to read data from the optical disc and controls the optical driving unit 30 to drive an LD within the optical pickup 20 with reproduction power in order to read data from the optical disc 10 or to drive the LD with record power in order to record data in the optical disc 10.

Further, the controller 70 controls the servo/driving unit 60 based on an RF signal and an error signal detected from the optical pickup 20 and output from the R/F unit 50 to drive the spindle motor 11 and thus rotates the optical disk 10 with a desired speed, and by driving the spindle motor 12, the controller 70 moves the optical pick up 20 to a desired location and applies a current to an actuator that supports an objective lens within the optical pickup 20, thereby performing focusing servo and tracking servo.

The interface unit 90 may be a Universal Serial bus (USB) and a Serial ATA (SATA) interface, connect a host and the optical disc apparatus 100 to give and take data or a command, and a removable optical disc apparatus may receive power from a host through an USB interface.

A method of controlling power according to an exemplary embodiment of the present invention may be embedded as implementation algorithm in one of the optical driving unit 30, the DSP 40, or the controller 70, receive a present temperature measured by the thermistor 80, calculate a driving value for driving an LD of the optical pickup 20 based on the received present temperature, and output the calculated driving value to the LD.

First, the algorithm that constantly maintains read power in relation to a read operation of reading data from an optical disc will be described.

The algorithm includes the data expressed by approximating a change of a driving value (read driving value) that drives an LD according to a temperature with an equation, and the read driving value is represented in a curve form increasing according to a temperature and may be expressed with, for example, a quadratic approximate equation.

Figure 4:
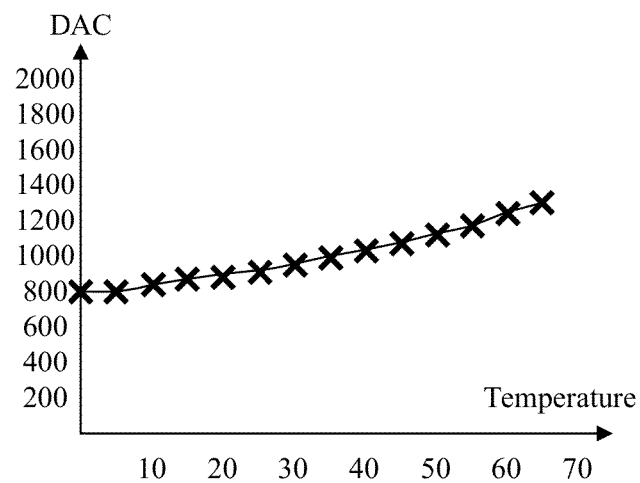
FIG. 4 is a graph illustrating a driving value for driving an LD so as to constantly maintain output power in each temperature.

A Read Driving Value (DAC) necessary for maintaining predetermined read power, for example, 1 mW output power is measured in each temperature of a predetermined interval through ten or more optical disc apparatuses and is represented in an XY plane that sets an X-axis as a temperature and that sets a Y-axis as a driving value. FIG. 4 illustrates a driving value for driving an LD with a graph so as to constantly maintain output power in each temperature, and as shown in FIG. 4, a driving value necessary for constantly maintaining power is shown in a curve form increasing according to a temperature.

In a graph of FIG. 4, a read driving value READ 1 of a read operation may be approximated with a quadratic function such as $READ\_1(T) = a1 \times T^2 + b1 \times T + c1$ (approximate equation 1) using a temperature T as a variable.

During a read operation, it is necessary to constantly maintain laser power of about 1 mW, but during a write operation, high laser power of 10-100 mW is necessary and required laser power increases according to the increase of a record double speed.

Figure 5:
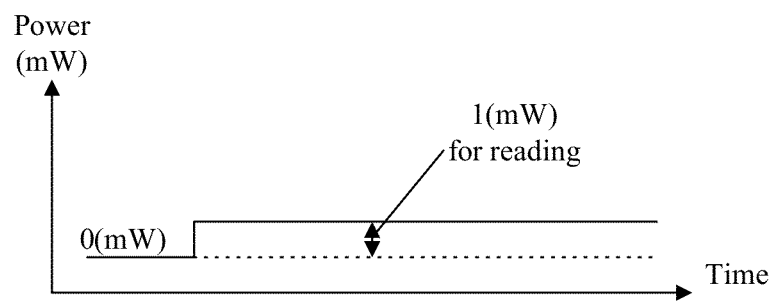
FIG. 5 is a graph illustrating a driving value for sequentially constantly driving an LD in order to output predetermined power in an optical disc read operation.
Figure 6:
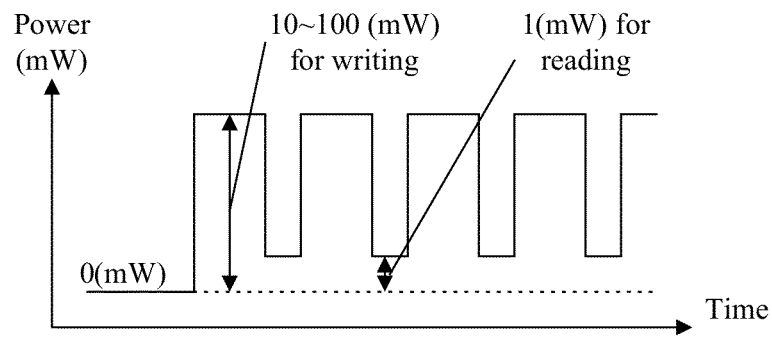
FIG. 6 is a graph illustrating a driving value for sequentially driving an LD in a pulse form in order to output power necessary for a data record operation.

FIG. 5 is a graph illustrating a driving value for sequentially constantly driving an LD in order to output predetermined power in an optical disc read operation, and FIG. 6 is a graph illustrating a driving value for driving sequentially an LD in a pulse form in order to output power necessary for a data record operation.

In a condition in which a temperature is constant, a driving value for constantly maintaining read power in a read operation sequentially maintains a constant value, but in a record operation, it is necessary to maintain record power, and in order to maintain servo, it is necessary to drive with power lower than record power. During a record operation, in order to read data of a disk and to obtain a servo signal so that a laser focus does not deviate from a track on the disk, the LD should be periodically or intermittently driven with read power.

That is, in a record operation, as shown in FIG. 6, in order to maintain servo, a lower driving value for outputting read power, for example, 1 mw is inserted between high driving values for outputting record power to drive an LD in a pulse form.

During a record operation, as shown in FIG. 6, high power is output by a record pulse of a high driving value and thus a temperature of a periphery of the LD is higher than that when a read operation, and thus the equation is different from an approximate equation between a temperature and a laser driving value in relation to a read operation.

Therefore, in order to compensate a read driving value during a record operation according to a temperature, for a plurality of optical disc apparatuses, during an actual record operation using an existing FMD and a power meter, a read driving value for outputting predetermined read power is measured in each temperature, and it is necessary to derive an approximate equation of a read driving value for a write operation, based on a measured driving value. During a record operation, a read driving value READ_2 of an LD in a temperature T may be approximated with a function of a quadratic equation such as READ (T)=$a2 \times T^2+b2 \times T+c2$ (approximate equation 2).

Figure 7:
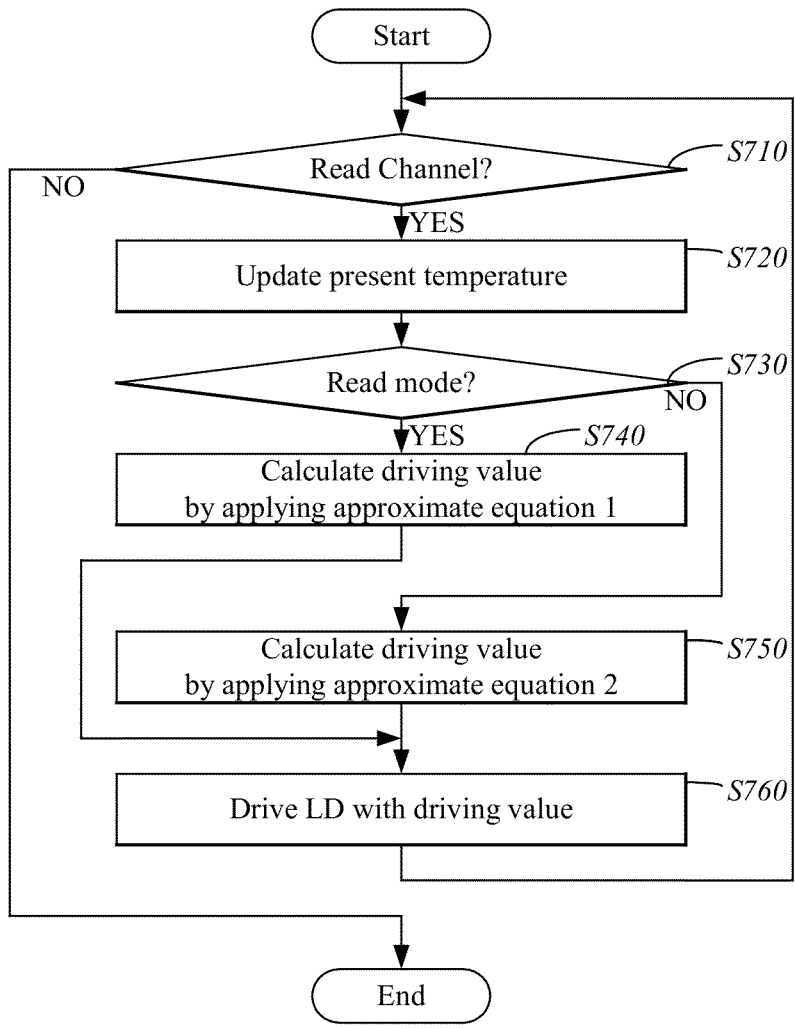
FIG. 7 is a flowchart illustrating operation of controlling read power according to an exemplary embodiment of the present invention.

FIG. 7 is a flowchart illustrating operation of controlling read power according to an exemplary embodiment of the present invention.

A method of controlling power of FIG. 7 may be implemented in the optical driving unit 30, the DSP 40, or the controller 70 of an optical disc apparatus. Hereinafter, it is assumed that the controller 70 performs operation flow of FIG. 7. The controller 70 may include a calculation unit that calculates a driving value of an LD for outputting target power for a present temperature using an approximate equation that describes a temperature and a driving value.

The controller 70 may store at an internal memory approximate equation 1 that describes a relationship between a temperature and a read driving value in a read mode and approximate equation 2 that describes a relationship between a temperature and a read driving value in a record mode, may store approximate equation 1 and approximate equation 2 only for predetermined output power, for example, 1 mW, and may store approximate equation 1 and approximate equation 2 for each of two or more read power necessary for a read operation.

Approximate equation 1 and approximate equation 2 may be stored at a nonvolatile memory in a process of producing the optical disc apparatus 100, and a value thereof may be periodically or intermittently updated through a server connected through the interface unit 90.

The controller 70 performs a power control routine and determines whether a channel to control laser power is a read channel (S710), and if a channel to control laser power is a read channel, the controller 70 receives a temperature from the thermistor 80 and updates a present temperature (S720).

The controller 70 determines whether a present operation of the optical disc apparatus 100 is performed in a read mode (S730), and if a present operation of the optical disc apparatus 100 is performed in a read mode, in order to output target power, for example, 1 mW in a present temperature by applying approximate equation 1, the controller 70 may calculate a driving value that should be applied to the LD (S740) and drive the LD by applying the calculated driving value to the optical driving unit 30 (S760).

If a present operation of the optical disc apparatus 100 is performed in a record mode instead of a read mode at step S730, in order to output read power, for example 1 mW in a present temperature in a record operation by applying approximate equation 2, the controller 70 may calculate a driving value that should be applied to the LD (S750), and drive the LD in a pulse form in which a read driving value is inserted between driving values of a high value for outputting record power in a record mode by applying the calculated driving value to the optical driving unit 30 (S760).

A process from step S710 of determining whether a channel is a read channel to step S760 of driving the LD with the calculated driving value may be repeated in an updated present temperature.

A method of determining a driving value of a write channel for generating a record pulse in a record mode is the same as a method of determining a driving value of a read channel, but target power is about 1 mW in a read channel, but has a wide range of 10-100 mW in a write channel, as shown in FIG. 6.

Therefore, when calculating a record driving value for enabling the LD to output target power using an approximate equation, it is necessary to divide target power into a plurality of segments and to derive an approximate equation of a driving value according to a temperature for each segment.

For this reason, for each segment that divides target power of a predetermined range into a plurality of segments, for example, for each segment that divides a record power range of 10-100 mW into, for example, a unit of 10 mW, by measuring a driving value necessary for constantly maintaining representative power of a corresponding segment according to a temperature change through, for example, ten or more optical disc apparatuses and by averaging measuring values of each optical disc apparatus, a driving value according to temperature change of a corresponding segment may be expressed with, for example, a function of a quadratic equation. A range of target power or the number of segments or an interval of a segment that divides target power may be changed to different values, and an approximate equation may be expressed with a quadratic equation or other function.

For example, for 10 mW output power, a record driving value WRITE_10 (write approximate equation 1) of an LD according to a temperature may be expressed with a quadratic function such as WRITE_10=$i1 \times T^2+j1 \times T+k1$ and, for 20 mW output power a record driving value WRITE_20 (write approximate equation 2) according to a temperature may be expressed with a quadratic function such as WRITE_20=$i2 \times T^2+j2 \times T+k2$, and similarly, for 100 mW output power, a record driving value WRITE_100 (write approximate equation 2) according to a temperature may be expressed with a quadratic function such as WRITE_100=$i10 \times T^2+j10 \times T+k10$.

A function that expresses a record driving value according to a temperature on each output power segment basis is stored at a memory, and a function of a segment corresponding to target output power determined in a record operation is called to be used for calculating a driving value for driving an LD with target output power.

FIG. 8 is a flowchart illustrating operation of controlling record power according to an exemplary embodiment of the present invention.

A method of controlling power of FIG. 8 may be implemented in the optical driving unit 30, the DSP 40, or the controller 70 of an optical disc apparatus, and it is assumed that the controller 70 performs operation flow of FIG. 8.

The controller 70 may store at the internal memory at least one write approximate equation that describes a relationship between a temperature and a record driving value in each segment in which record output power of a predetermined range is divided into a plurality of segments.

An approximate equation of each segment may be stored at a nonvolatile memory in a process of producing the optical disc apparatus 100, and a value thereof may be periodically or intermittently updated through a server connected through the interface unit 90.

The controller 70 performs a power control routine and determines whether a channel to control laser power is a write channel (S810), and if a channel to control laser power is a write channel, the controller 70 receives a temperature from the thermistor 80 and updates a present temperature (S820).

When recording an optical disc, while the controller 70 controls a rotation of a disk with a constant linear velocity at every predetermined section, recording of an optical disc is advanced from an inner circumference to an outer circumference, and thus while recording of data is performed, a record speed increases and thus record power should increase. Accordingly, by applying a write approximate equation corresponding to pre sent record power, an LD driving value should be calculated.

The controller 70 searches for a segment to which target output power for record belongs and calculates a driving value that should be applied to the LD in order to output corresponding target output power in a present temperature by applying a write approximate equation of a corresponding segment (S830), continues to determine whether present target power is equal to previous target power (S840), and searches for a segment to which present target power belongs and repeats operation of applying a write approximate equation corresponding to a corresponding segment.

The controller 70 may drive the LD by applying the calculated driving value to the optical driving unit 30 (S850).

A process from step S810 of determining whether a channel is a write channel to step S850 of driving the LD with the calculated driving value may be repeated in an updated present temperature.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A method of controlling power in an optical disc apparatus, the method comprising:
    measuring a temperature of an inside of the optical disc apparatus;
    calculating, based on the measured temperature, a driving value with which a laser diode (LD) outputs target power using a function in which a temperature acts as a variable; and
    driving the LD with the calculated driving value,
    wherein the calculating calculates the driving value for a read channel and a write channel in a divided manner, and
    wherein the calculating calculates, for the write channel, a driving value of at least one segment of record power which is divided into two or more segments using a function different from a function of another segment.

2. The method of claim 1, wherein the function in which a temperature acts as a variable is stored at a nonvolatile memory in a production process of the optical disc apparatus.

3. The method of claim 1, wherein the calculating calculates, for the read channel, a driving value of read power in a read mode and a driving value of read power in a record mode using different functions.

4. The method of claim 1, wherein the calculating further comprises searching for a segment to which target record power belongs.

5. An optical disc apparatus, comprising:
    an optical pickup configured to read data from an optical disc or to record data in an optical disc using output light of a Laser Diode (LD);
    an optical driving unit configured to drive the LD;
    a thermistor configured to measure a temperature of an inside of the optical disc apparatus;
    a memory configured to store at least one function in which a temperature acts as a variable; and
    a calculation unit configured to calculate a driving value with which the LD can output target power based on a temperature measured by the thermistor and to output the driving value to the optical driving unit,
    wherein the calculation unit calculates driving values for a read channel and a write channel in a divided manner and calculates, for the write channel, a driving value of at least one segment of record power which is divided into two or more segments using a function different from a function of another segment.

6. The optical disc apparatus of claim 5, wherein the calculation unit calculates, for the read channel, a driving value of read power in a read mode and a driving value of read power in a record mode using different functions.

* * * * *